(12) United States Patent
Graceffo et al.

(10) Patent No.: US 10,079,706 B2
(45) Date of Patent: Sep. 18, 2018

(54) APPARATUS FOR ORTHOGONAL 16-QPSK MODULATED TRANSMISSION

(71) Applicant: Raytheon Company, Waltham, MA (US)

(72) Inventors: Gary M. Graceffo, Burke, VA (US); Andrew Kowalevicz, Arlington, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/215,937

(22) Filed: Jul. 21, 2016

(65) Prior Publication Data
US 2018/0026817 A1  Jan. 25, 2018

(51) Int. Cl.
*H04L 27/20* (2006.01)
*H04B 7/0404* (2017.01)
*H04B 7/06* (2006.01)

(52) U.S. Cl.
CPC .......... *H04L 27/20* (2013.01); *H04B 7/0404* (2013.01); *H04B 7/06* (2013.01)

(58) Field of Classification Search
CPC .......... H04L 27/20; H04B 7/06; H04B 7/0404
See application file for complete search history.

(56) References Cited

U.S. PATENT DOCUMENTS

| | | | | |
|---|---|---|---|---|
| 5,625,624 A | * | 4/1997 | Rosen | H04B 7/18523 370/307 |
| 6,101,174 A | * | 8/2000 | Langston | H01Q 1/246 370/312 |
| 6,473,467 B1 | * | 10/2002 | Wallace | H04B 7/0417 370/208 |
| 7,961,813 B2 | * | 6/2011 | Tanaka | H04B 7/0615 375/130 |
| 9,692,139 B2 | * | 6/2017 | Kowalevicz | H01Q 21/00 |
| 2012/0264387 A1 | * | 10/2012 | Rofougaran | H04B 7/088 455/272 |
| 2015/0207551 A1 | * | 7/2015 | Kang | H04B 7/0608 375/296 |
| 2017/0012732 A1 | * | 1/2017 | Kowalevicz | H01Q 21/00 |
| 2017/0093606 A1 | * | 3/2017 | Dutronc | H04L 27/2639 |

* cited by examiner

*Primary Examiner* — Jean B Corrielus
(74) *Attorney, Agent, or Firm* — Schwegman Lundberg & Woessner, P.A.

(57) ABSTRACT

An apparatus, method and article of manufacture comprise a transceiver coupled to a phased array of antenna elements that are configured into pluralities of antenna elements to generate N modes of orthogonal radio waves where N is equal to or greater than 2. The coupling is via a plurality of 16-quadrature phase shift key (16-QPSK) modulators, each which is coupled to a respective one of the pluralities of antenna elements to modulate data onto a respective one of the N modes of orthogonal radio waves, to cause each of the N modes to operate as an independent data channel. For the case of N=2 modes, two 16-QPSK modulators generate independent 16-QPSK constellations, one for the first of the two modes and one for the second of the two modes, such that two 16-QPSK constellations are independent of each other, are orthogonal, and are on the same frequency.

15 Claims, 8 Drawing Sheets

APPARATUS FOR ORTHOGONAL 16-QPSK MODULATED TRANSMISSION

TECHNICAL FIELD

Embodiments pertain to providing a modulation method that improves modulation efficiency and reduces the required energy per bit to achieve a particular Bit Error Rate (BER) for communications. Some embodiments relate to a modulation method using orthogonal waveforms.

BACKGROUND

The use of wireless communication systems has become widespread, with billions of people using the internet via wireless connectivity. With such usage, the cost, efficiency and error rate of connectivity has become highly important. Quadrature Phase Shift Keying (QPSK) has been used in some modulation schemes. Many current methods for increasing the number of bits per Hertz (Hz), beyond QPSK, use non-orthogonal waveforms to generate symbols. Non-orthogonal approaches have many undesirable consequences. Consequently, there is a desire and a need for a modulation method that doubles the data rate of QPSK, while achieving the same BER for the same energy per bit as QPSK without the limitations of non-orthogonal modulation schemes.

DETAILED DESCRIPTION

Figure 1A:
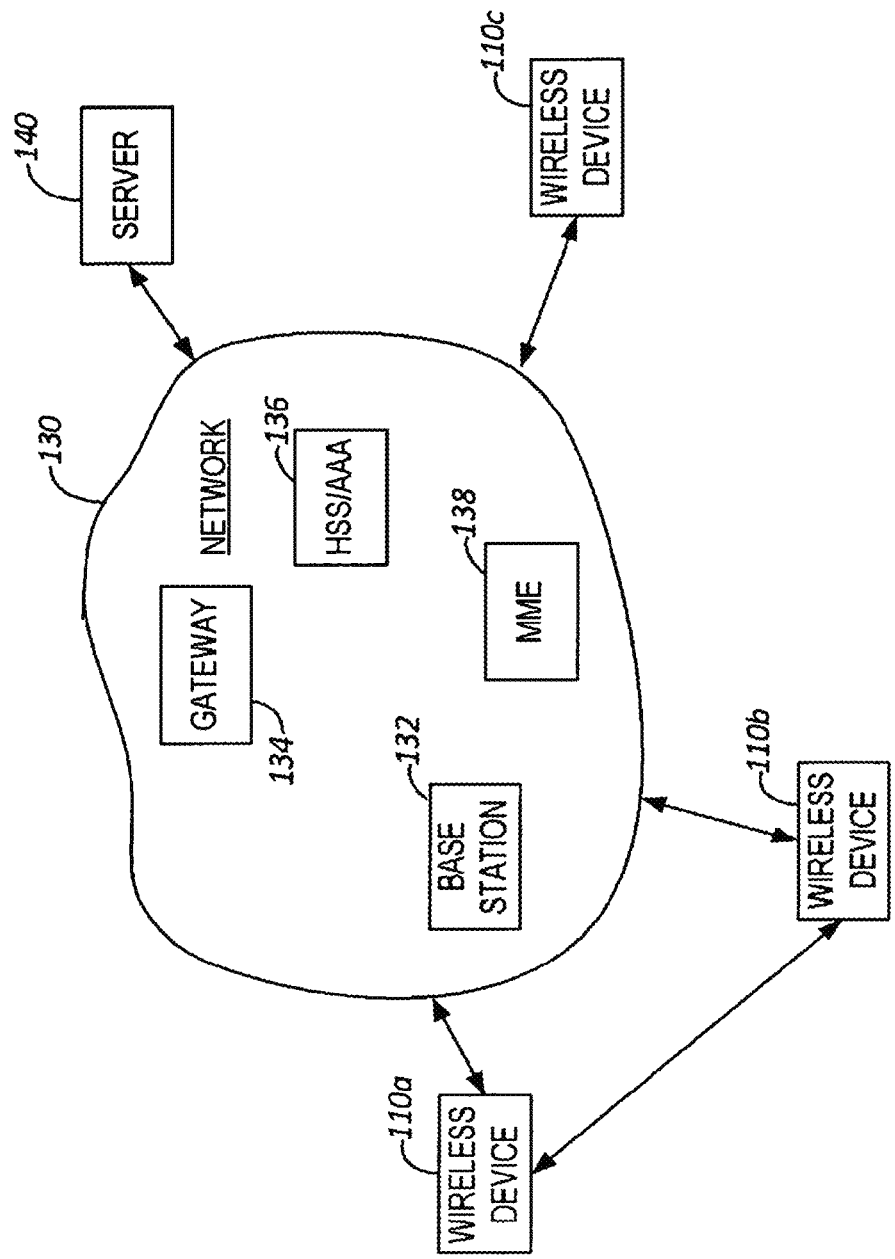
FIG. 1A is a functional block diagram illustrating a communication system in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 is a functional block diagram illustrating a communication system in accordance with some embodiments. FIG. 1 is a functional block diagram illustrating one embodiment of a network 100 in which wireless devices 110a, 110b, 110c communicate with other wireless devices and/or one or more servers 140. The wireless devices 110a, 110b, 110c may communicate with each other directly or through one or more networks 130. The wireless devices 110a, 110b, 110c may communicate locally, for example, via one or more micro, pico or nano base stations (BSs) or access points (APs) or directly using any of a number of different techniques, such as WiFi, Bluetooth or Zigbee, among others. Alternatively, the wireless devices 110 may also communicate through the network 130 via Third Generation Partnership Project Long Term Evolution (3GPP LTE) networks and LTE advanced (LTE-A) networks, $4^{th}$ generation (4G) networks or $5^{th}$ generation (5G) networks. Examples of wireless devices 110a, 110b, 110c, sometimes referred to as user equipment (UE), include, but are not limited to, mobile devices such as portable handsets, smartphones, tablet computers, laptop computers, wearable devices, and sensors. The server 140 may provide audio and/or video content or support for applications running on the wireless device 110a, 110b, 110c. Note that although wireless devices are shown in FIG. 1, in other embodiments, some or all of the devices may be wired devices.

The network 130 may have all of the features, hardware, and systems of networks, however, only a few elements in the network 130 are shown for exemplary purposes. The network may contain a base station (which may be e.g., an enhanced NodeB or eNB) 132, a gateway 134 (serving and/or home gateway), a Home Subscriber Server (HSS) 136, and a Mobility Management Entity (MME) 138, among others. The base station 132 may provide the initial point of connection to the network 130 by each wireless device 110a, 110b, 110c. The HSS 136 may be a database of user (subscriber) information, i.e., customer profiles and provide authentication for use of the network 130 by a particular wireless device 110a, 110b, 110c. The user information may include account information, account status, user preferences, features subscribed to by the user, user's current location, and allowable access point names (APNs). The HSS 136 may provide the user profile to a Mobility Management Entity (MME) 138, which controls network access of the wireless devices 110a, 110b, 110c through the gateway 134. The network 130 may also contain various servers that provide content or other information related to user accounts.

During a communication session through a network, whether a local-area network (LAN) such as a high efficiency WLAN (HEW) operative according to Institute of Electrical and Electronics Engineers (IEEE) 802.1 lax family of standards, or such as a wide-area network (e.g., 4G-based), a transmitting wireless device 110a may typically transmit a signal using one of a number of wireless protocols, examples of which are provided above. The signal received by a receiving wireless device 110c may have a waveform that permits detection in a static fashion by the receiving wireless device 110c.

Millimeter Wave Operation

Figure 1B:
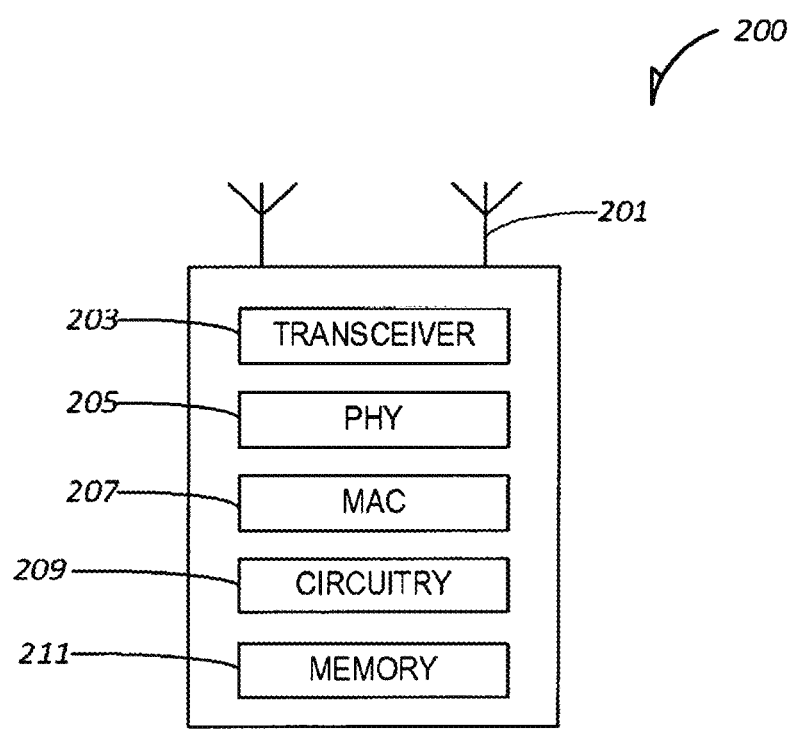
FIG. 1B illustrates a mobile station (MS) device in accordance with some embodiments.

Both the AP's and the UE's may be configured for operation in millimeter-wave (mmWave) communication, particularly 5G. In some 5G embodiments, a UE may communicate data (e.g., using a PDSCH and/or a PUSCH) with a small cell or secondary cell while configured by a larger serving cell or primary cell and receiving control signals from the primary cell (with a PDCCH). In these embodiments, communications with the smaller cell may take place using millimeter-wave (mmWave) frequencies while communications with the larger cell may take place using microwave frequencies. In practice there may be several BSs and several UEs to allow for tracking and for such processes as hand-off, as needed. One or more wireless devices 110a-110c may be viewed as mobile device 200 of FIG. 1B in some embodiments. FIG. 1B illustrates a mobile station (MS) device in accordance with some embodiments. MS device 200 is a more detailed description of one or more of the wireless devices 110a-110c of FIG. 1A. MS device 200 may be a mmWave-compliant MS device that may be arranged to communicate with one or more other MS devices or one or more BS. As discussed above, MS device 200 may be suitable for operating as UE. In some embodiments, MS device 200 may include, among other things, a transmit/receive element 201 (for example an antenna), a transceiver 203, physical (PHY) circuitry 205, and media access control (MAC) circuitry 207. PHY circuitry 205 and MAC circuitry 207 may be mmWave compliant layers and may also be compliant with one or more other IEEE 802.11ax or IEEE 802.13 standards. MAC circuitry 207 may be arranged to configure packets such as a physical layer convergence procedure (PLCP) protocol data unit (PPDUs) and arranged to transmit and receive PPDUs, among other things. MS device 200 may also include circuitry 209 configured to perform the various operations described herein. The circuitry 209 may be coupled to the transceiver 203, which may be coupled to the transmit/receive element 201. While FIG. 1A depicts the circuitry 209 and the transceiver 203 as separate components, the circuitry 209 and the transceiver 203 may be integrated together in an electronic package or chip.

In some embodiments, the MAC circuitry 207 may be arranged to contend for a wireless medium during a contention period to receive control of the medium for an appropriate control period and configure a High Efficiency WLAN (HEW) Physical Layer Convergence Protocol (PLCP) Protocol Data Unit (HEW PPDU). In some embodiments the PHY circuitry 205 may be arranged to transmit 5G mmWave packets. In some embodiments, the MAC circuitry 207 may be arranged to contend for the wireless medium based on channel contention settings, a transmitting power level, and a Clear Channel Assessment (CCA) level.

In some embodiments the PHY circuitry 205 may be arranged to transmit the HEW PPDU. The PHY circuitry 205 may include circuitry for modulation/demodulation, upconversion/downconversion, filtering, amplification, and the like. In some embodiments, the circuitry 209 may include one or more processors which may be configured for parallel processing. The circuitry 209 may be configured to perform functions based on instructions being stored in a RAM or ROM, or based on special purpose circuitry. The circuitry 209 may include processing circuitry and/or transceiver circuitry in some embodiments. The circuitry 209 may include a processor such as a general purpose processor or special purpose processor. The circuitry 209 may implement one or more functions associated with transmit/receive elements 201, the transceiver 203, the PHY circuitry 205, the MAC circuitry 207, and/or the memory 211. In some embodiments, the circuitry 209 may be configured to perform one or more of the functions and/or methods described herein.

In some embodiments, the transmit/receive elements 201 may be two or more antennas that may be coupled to the PHY circuitry 205 and arranged for sending and receiving signals including transmission of the HEW packets. The transceiver 203 may transmit and receive data such as HEW PPDU and packets that include an indication that the MS device 200 should adapt the channel contention settings according to settings included in the packet. The memory 211 may store information for configuring the other circuitry to perform operations for configuring and transmitting HEW packets and performing the various operations to perform one or more of the functions and/or methods described herein.

In some embodiments, the MS device 200 may be configured to communicate using OFDM communication signals over a multicarrier communication channel. In some embodiments, MS device 200 may be configured to communicate in some one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1A, although the scope of the embodiments is not limited in this respect as they may also be suitable to transmit and/or receive communications in some other techniques and standards. In some embodiments, the MS device 200 may use 4× symbol duration of 802.11n or 802.11ac.

In some embodiments, an MS device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, and the like.), an access point, a base station, a transmit/receive device for a wireless standard such as 802.11 or 802.16, or other device that may receive and/or transmit information wirelessly. In some embodiments, the MS device may include one or more of a keyboard, a display, a non-volatile memory port, multiple antennas, a graphics processor, an application processor, speakers, and other mobile device elements. The display may be an LCD screen including a touch screen.

The transmit/receive element 201 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas may be effectively separated to take advantage of spatial diversity and the different channel characteristics that may result.

Although the MS device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium, or a machine-readable hardware storage device. Those instructions may then be read and executed by one or more processors to enable performance of the operations described herein. Those instructions may then be read and executed by one or more processors to cause the MS device 200 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, and the like.

Orthogonal Waveforms and Modulation

In present day modulation schemes using orthogonal waveforms, Quadrature Phase Shift Keying (QPSK), for example, may be used to provide two bits per symbol. There are methods used today to increase the number of bits per Hz transmitted. It is desirable when designing a modulation method to maintain orthogonality within the signal space. Orthogonality minimizes the required energy per bit to obtain a particular BER. Unfortunately, designers have been limited to the available orthonormal dimension space. When designing a waveform, the following attributes are desirable:

1. All constellation points are equidistant from the constellation center.

This is important because the resulting waveform has a constant envelope. A constant envelop is desirable because it allows the transmitter to operate close to the power amplifier's saturation region for greater efficiency. When the waveform envelope varies, the power amplifier in the transmitter is backed off according to the peak-to-average power ratio; thereby reducing power efficiency.

2. All constellation points are equidistant from adjacent neighbors. This attribute allows for all points having the same probability of error.

3. One constellation symbol per quadrate. This helps to minimize the probability of error. Adding additional symbols, orthogonality to the QPSK constellation maximize the above criteria.

The available orthogonal dimensions to the waveform designer are two dimensions in signal space, time, and frequency. In signal space, sine and cosine are used as basis vectors to achieve orthogonality. This is the structure used for QPSK. One bit is transmitted on each of the two dimensions on the same frequency.

Time slots used in Time Division Multiple Access (TDMA) are orthogonal; however, they reduce the user's throughput. Frequency Division Multiplexing (FDM) is also orthogonal, but requires more bandwidth. Consequently, waveform designers must use non-orthogonal techniques such as 16-QAM (Quadrature Amplitude Modulation) to increase the number of bits per Hz. 16-QAM uses both phase and amplitude to distinguish symbols; neither of which is orthogonal.

Figure 2:
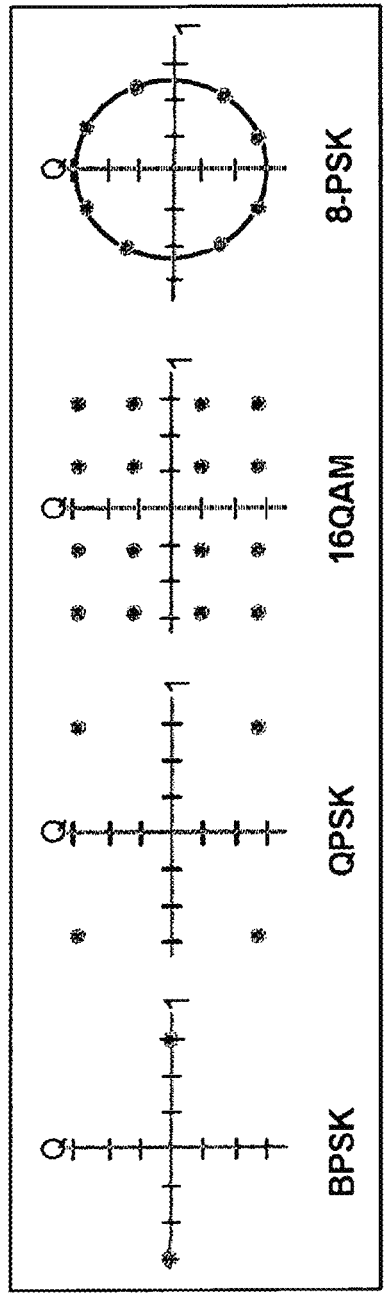
FIG. 2 illustrates constellations for several modulation schemes with increasing bit density.

FIG. 2 illustrates constellations for several modulation schemes with increasing bit density. As one can see by inspection, BPSK and QPSK meet the above three criteria. However, denser schemes must resort to non-orthogonal structures to increase density. In other words, a bit density greater than QPSK is achieved with the same energy per bit or energy per symbol.

Table 1 below lists the attributes of some of the popular waveforms. One can see the advantage of 16-QPSK modulation over other schemes.

TABLE 1

Table of Waveform Attributes

| Modulation Format | Number of Symbols | Number of Bits/symbol | Efficiency Bit Rate/ Bandwidth | Error Free Eb/No |
|---|---|---|---|---|
| 16 PSK | 16 | 4 | 2 | 18 dB |
| 16 QAM | 16 | 4 | 2 | 15 dB |
| 8 PSK | 8 | 3 | 1.5 | 14.5 dB |
| 16-QPAK | 16 | 4 | 4 | 10.1 dB |
| QPSK | 4 | 2 | 1 | 10.1 dB |
| BPSK | 2 | 1 | 0.5 | 10.5 dB |

Figure 4:
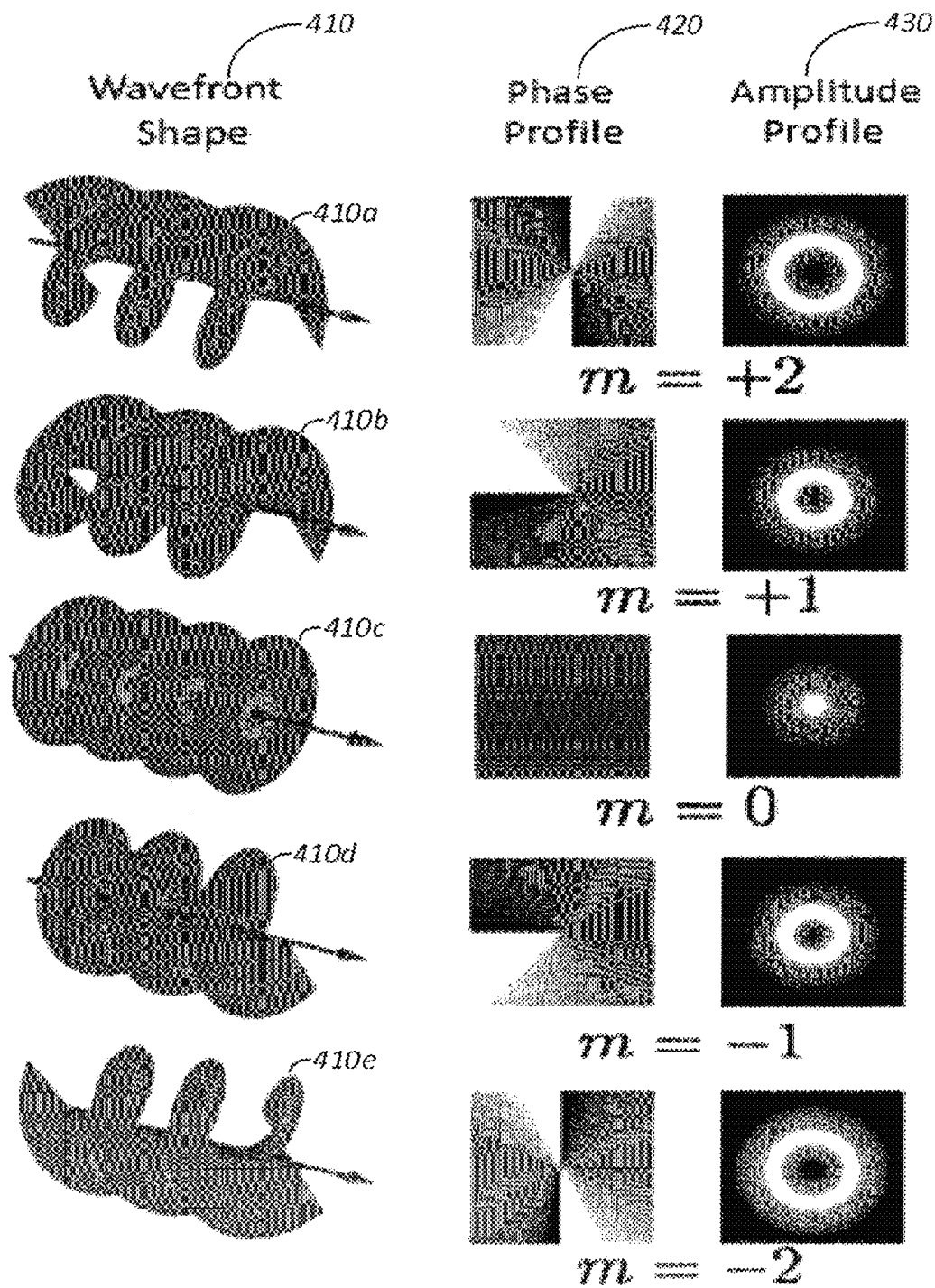
FIG. 4 illustrates several orthogonal angular momentum (OAM) modes in accordance with some embodiments.

Using the techniques based on waves developed using orthogonal angular momentum (OAM), for example, other dimensions of signal orthogonality that were not previously available to waveform designers can be exploited. FIG. 4 illustrates several OAM modes in accordance with some embodiments. The left column 410 depicts OAM modes 410a, 410b, . . . 410e propagating in free space. The spiral propagation pattern of wavefronts can be observed. The middle column 420 illustrates the phase profile of a planar cross section of the wavefront for each mode. The right column 430 shows the amplitude profile for each of the propagating OAM wavefronts for each mode. To generate and receive OAM modes in wireless communication an appropriate radio system communication architecture would address OAM antenna topology, mode generation/reception topology and multi-OAM signaling. OAM communication system architecture is both similar to and different from a conventional wireless communication system. Like a conventional wireless communication system, an OAM communication system comprises traditional system blocks such as the baseband components for digital signal processing, RF front end components comprising RF elements such as filters, amplifiers, local oscillators, mixers, and other components, and the antenna system. This is discussed in more detail below.

Figure 3:
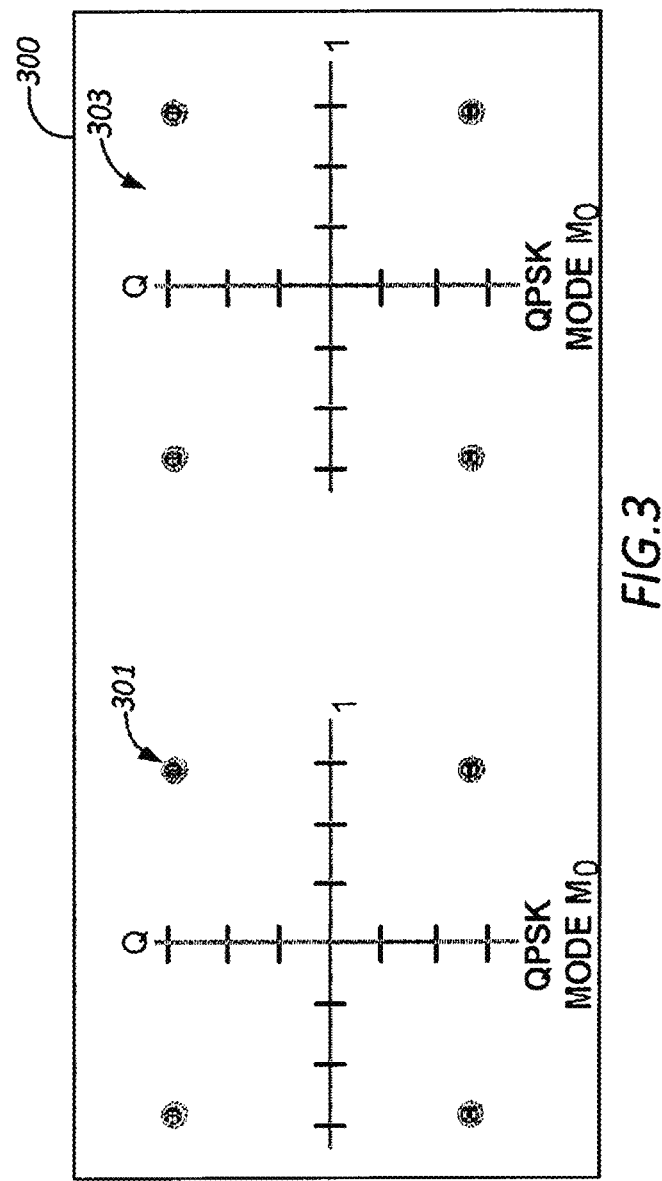
FIG. 3 illustrates 16-QPSK constellations in accordance with some embodiments.

One technique described herein uses independent modulation of multiple propagation modes such as is illustrated in FIG. 3. FIG. 3 illustrates 16-QPSK constellations 300 in accordance with some embodiments. Modes are solutions to the wave equation that will propagate. Mode 0 is the propagation mode for a conventional plane wave while all other modes are non-planar. Each mode is orthogonal to every other mode. This property can be exploited, by making each mode an independent channel. In one embodiment, QPSK is used simultaneously, on two concurrent modes. For example, Mode 0 may contain one QPSK constellation as at 301 while Mode 1 contains a second, independent, QPSK constellation as at 303. The result is two orthogonal QPSK constellations on the same frequency. The left plot, 301, in FIG. 3 is the Mode 0 constellation and the right plot, 303 is the Mode 1 constellation. Note that two two-dimensional constellations are used to show the waveform constellation. A single plot is not used because the plot of the constellation is represented in four dimensions or 4-space.

Below are the basis vectors and the waveform equation for the 16-QPSK modulation scheme.

Basic Vectors:

$$\phi_1(t) = \sqrt{\frac{2E_s}{T_s}}\cos(wt) \quad \phi_2(t) = \sqrt{\frac{2E_s}{T_s}}\sin(wt)$$

Waveform Equation $$S(t) = \left(\sqrt{\frac{2E_s}{T_s}}\cos(wt + (2n-1)\frac{\pi}{4})\right)\psi_{M_0} + \left(\sqrt{\frac{2E_s}{T_s}}\cos(wt + (2n-1)\frac{\pi}{4})\right)\psi_{M_1}$$

where:
$\phi_m(t)$ are QPSK basis vectors, where m is 1 or 2;
S is the waveform equation;
w is annular frequency;
$\psi_{M_0}$ is Mode 0 two dimensional vector space;
$\psi_{M_1}$ is Mode 1 two dimensional vector space;
Es is symbol energy;
Ts is symbol period;
n is the quadrant number for the QPSK modulator, where n=1, 2, 3, 4; and
t is time.

Figure 5:
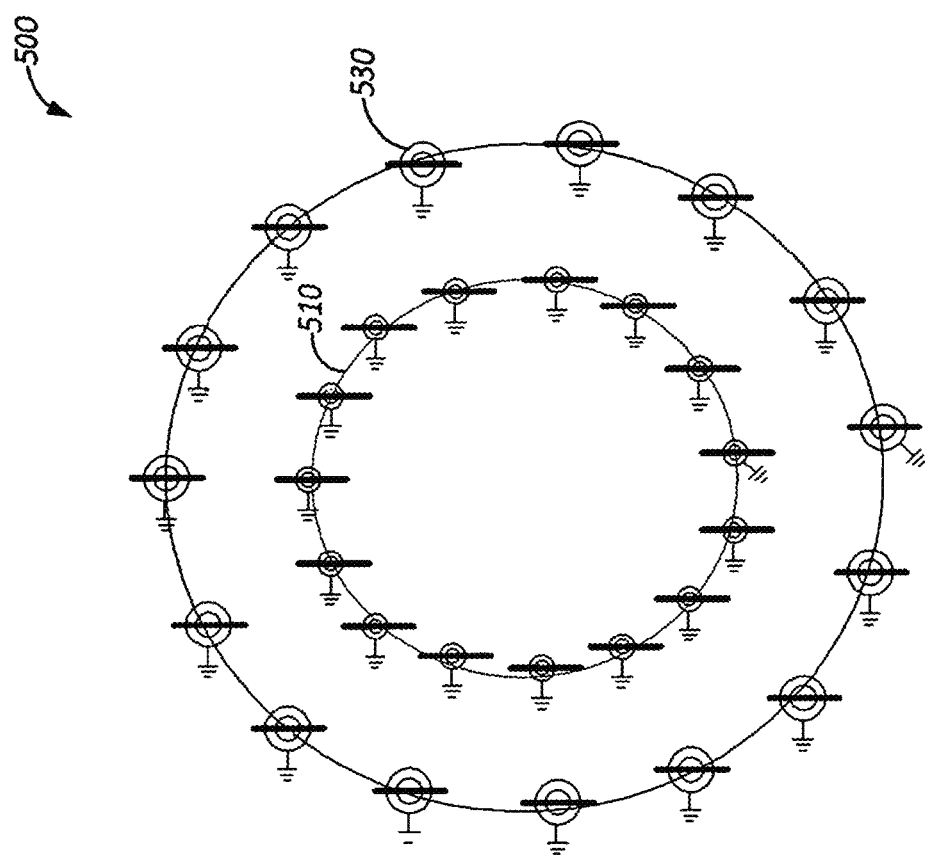
FIG. 5 illustrates the circular array radiation side of an antenna array to generate orthogonal angular momentum (OAM) modes in accordance with some embodiments.

FIG. 5 illustrates the circular array radiation side of an antenna array to generate orthogonal angular momentum (OAM) modes in accordance with some embodiments. FIG. 5 is an example of concentric antenna array 500 to generate two OAM modes using patch antenna elements in accordance with some embodiments. The illustrated antenna embodiment uses concentric rings of circular antenna arrays to generate separate OAM modes. Each concentric antenna array ring generates a different mode, the total number of modes desired dictate the number of concentric rings used. Each of the concentric antenna array rings 510, 520 could be made of any type of antenna element. The circles, such as circle 530, represent antennas in the antenna array. There is no particular type of antenna required for the array 500, as any type of antenna that behaves as discussed below can be used. Patch antennas are one example.

Each antenna ring 510, 520 can each be used to generate an independent OAM mode by stimulating each antenna element with a slightly different phase profile so that the total circumferential phase profile is $2\pi m$, where m represents the mode order that is being generated. In FIG. 5 the inner antenna ring 510 comprises the inner circle of fifteen antennas and may be used to generate mode M0 according to some embodiments. The second antenna ring 520 is a fifteen-antenna array in circle 520. More or fewer antennas may be used per ring so long as the phase excitation of the antennas in the equations set forth below is maintained. The maximum number of antenna elements is determined by the perimeter of the array ring. The design equation for phase shift determination are set forth next below.

$$d\phi = M\frac{2\Pi}{N_e}$$

$$\phi_i = N_i\left[M\frac{2\Pi}{N_e}\right]$$

where:
N_e is the number of array elements, and $N_e$ is at least 1 plus the mode number M;
M is the mode number, an integer between $[-(N_e-1)$ and $(N_e-1)]$;
Mode 0 is a conventional plane wave;
$\phi_i$ is the phase shift for the $i^{th}$ antenna element; and
$d\phi$ is the phase shift for the antenna element adjacent to the ith antenna element.

Figure 6:
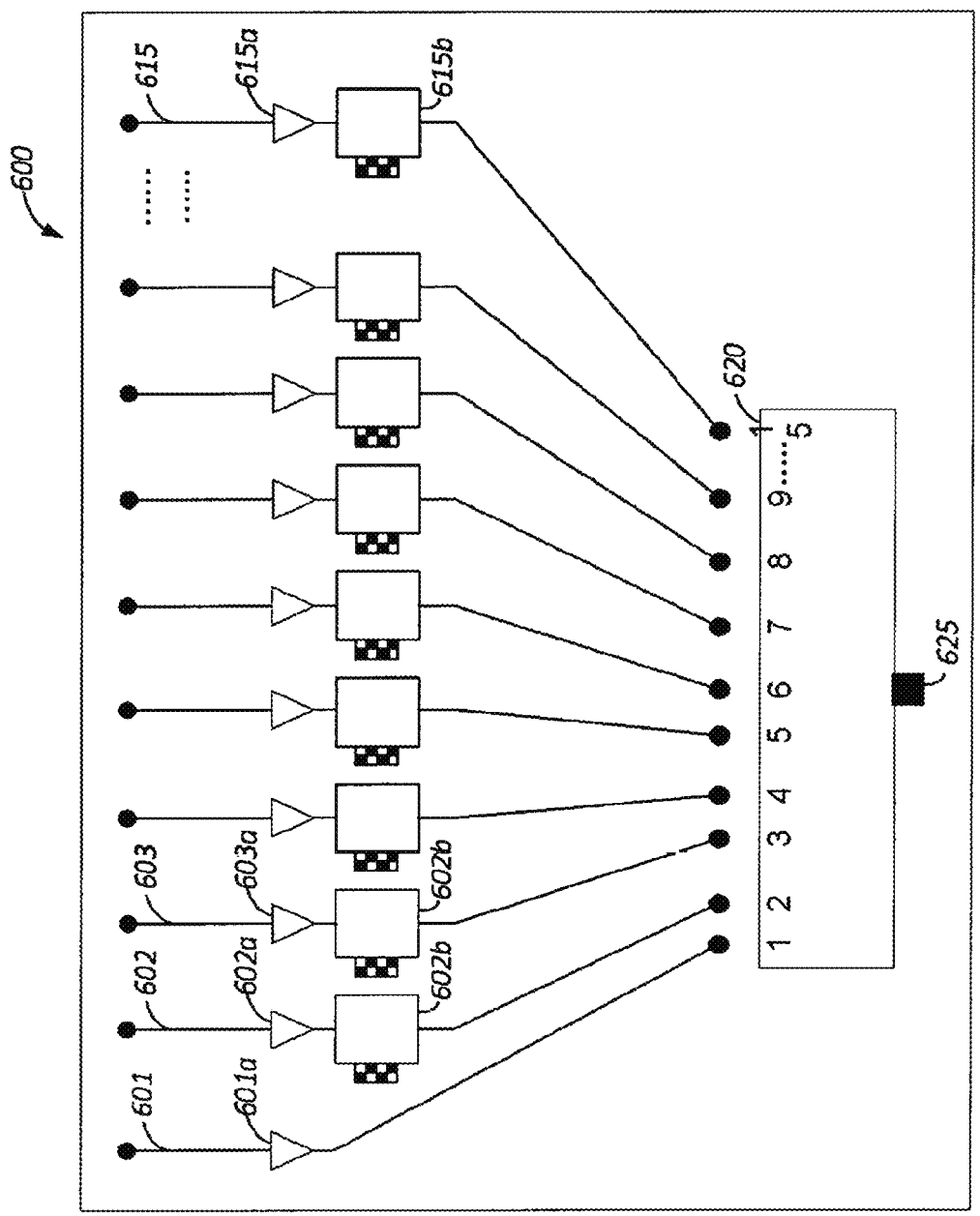
FIG. 6 illustrates an antenna array interface board layout in accordance with some embodiments.

FIG. 6 illustrates an antenna array interface board layout in accordance with some embodiments. Antenna interface board 600 connects output 625 from one of the QPSK modulators 705, 707 to be discussed below with respect to FIG. 7, via 16-way connector 620 that supplies QPSK modulated signals to respective antenna array elements of one of the antenna arrays 510 or 520 of FIG. 5, via lines 601, 602, 603, . . . 615 to generate a given mode, for example M0 illustrated in FIG. 5. Phase shifters 602b, 603b, . . . 615b apply the correct phase to the antenna array 510 to insure that propagation Mode 0 is generated.

Figure 7:
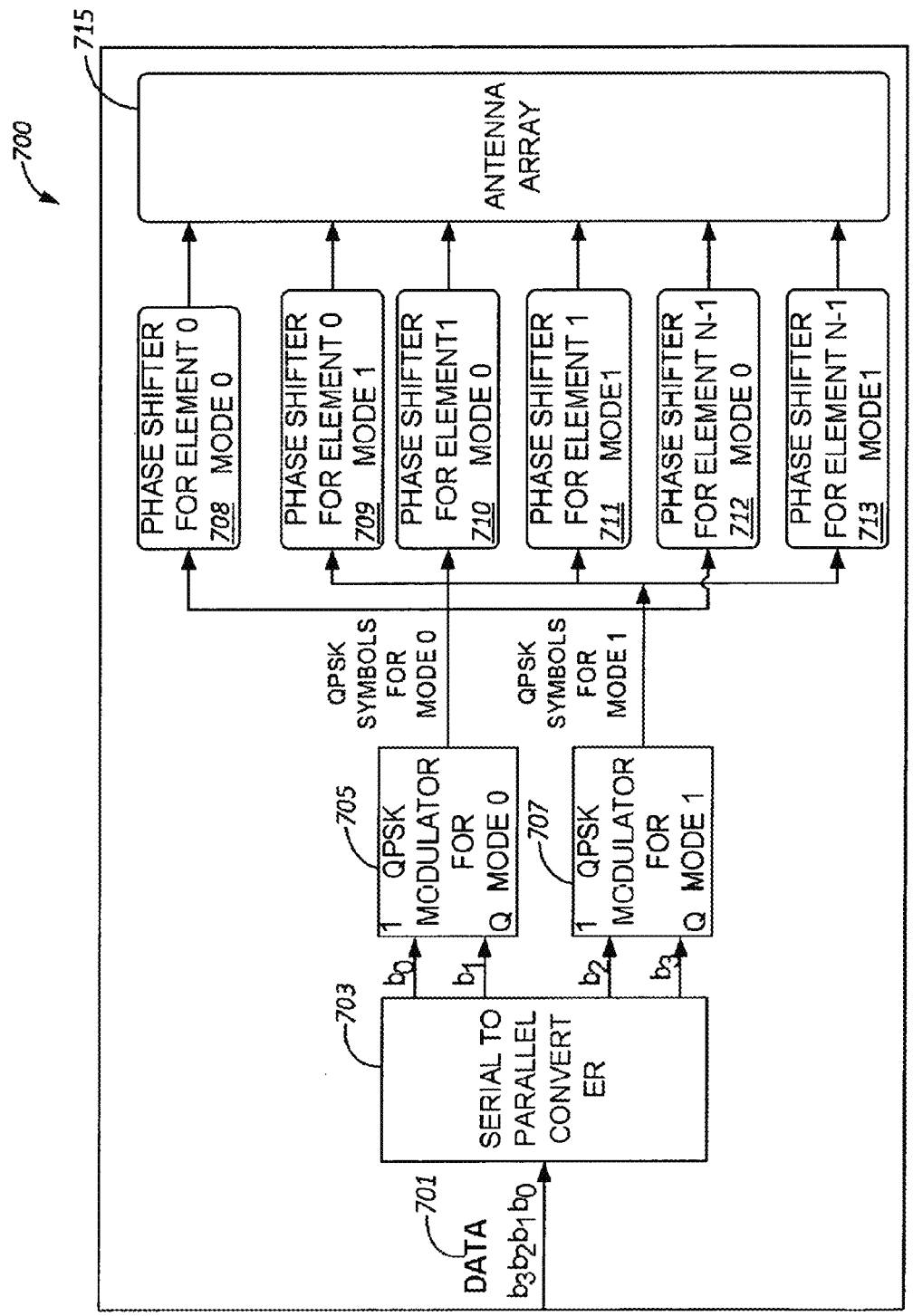
FIG. 7 illustrates a block diagram of a 16-QPSK transmitter of a transceiver in accordance with some embodiments.

FIG. 7 illustrates a block diagram of a 16-QPSK transmitter of a transceiver in accordance with some embodiments. Data bits enter serial-to-parallel convertor 703 of QPSK transmitter 700 at 701. Four bits at a time are provided in pairs as input to each of the two QPSK modulators, in some embodiments. Each modulator uses QPSK symbols to drive one of the two antenna modes, Mode 0 or Mode 1, of the antenna array 715. This will ultimately result in each of the two modes generated by the antenna array of FIG. 6 being an independent data channel by using QPSK modulation simultaneously and independently on the two concurrent modes, Mode 0 and Mode 1. Phase shifters 708, 710, . . . 712 apply the correct phase to the antenna array 715 to insure that propagation Mode 0 is generated, wherein the QPSK symbols from QPSK modulator 705 are modulated on OAM wave Mode 0. Phase shifters 709, 711 . . . 713 apply the correct phase to the antenna array to ensure that the propagation Mode 1 is generated, wherein the QPSK symbols from QPSK modulator 707 are modulated on OAM wave Mode 1. In some embodiments the phase shifters are located on antenna interface boards such as that described in FIG. 6. The antenna array can be any of a number of configurations. One possibility is two concentric circles of radiating elements, one circle for Mode 0 and the other for Mode 1 as seen in FIG. 5.

Figure 8:
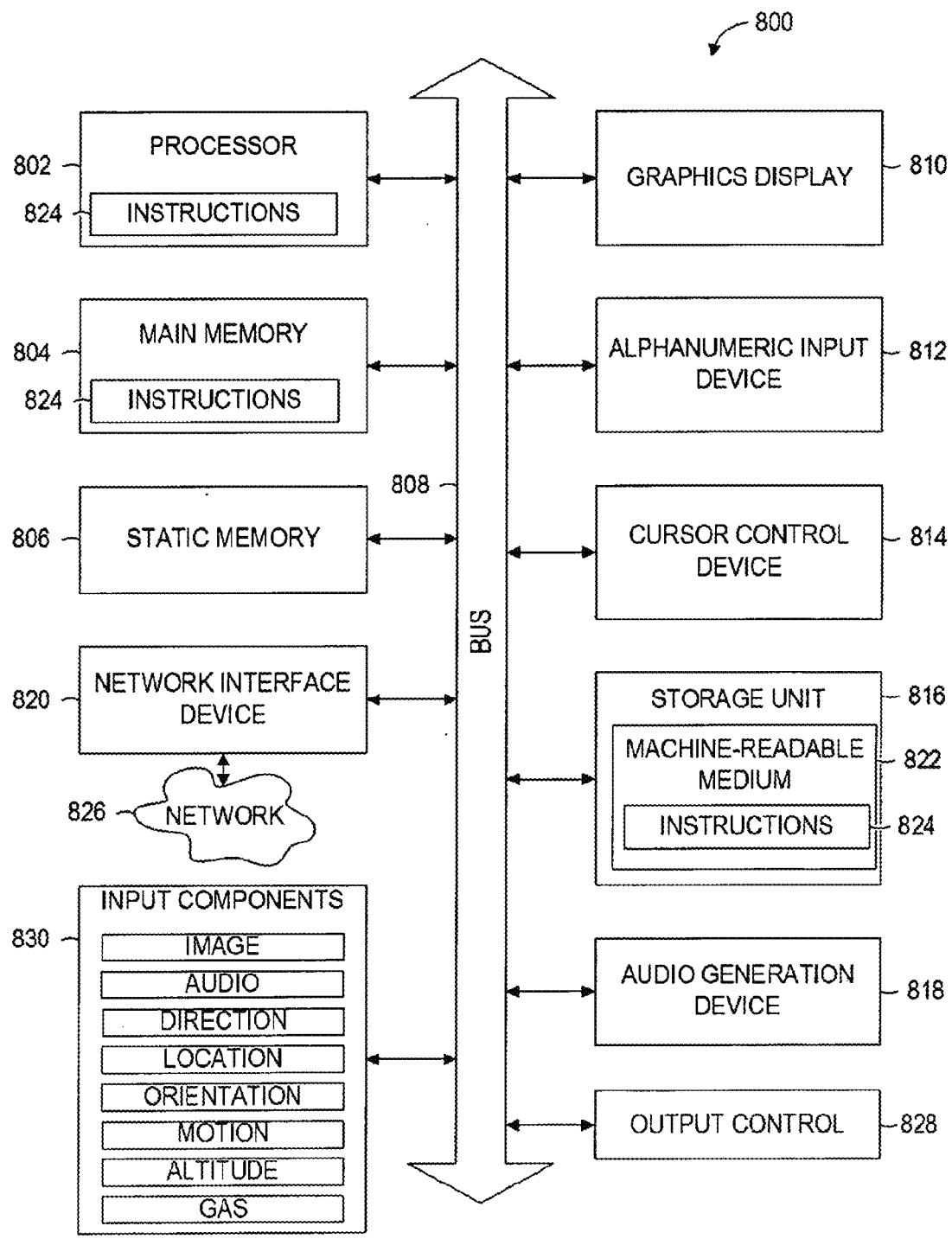
FIG. 8 illustrates a block diagram of an example machine in accordance with some embodiments, able to read instructions from a machine-readable medium and perform any one or more of the methodologies discussed herein.

FIG. 8 illustrates a block diagram of a wireless device in accordance with some embodiments. In some embodiments, the wireless device 800 may be the wireless device shown in FIG. 1, and may be a computer configured to perform any one or more of the techniques during transaction events discussed herein. In alternative embodiments, the wireless device 800 may operate as a standalone device or may be connected (e.g., networked) to other computers. In a networked deployment, the wireless device 800 may operate in the capacity of a server, a client, or both in server-client network environments. In an example, the wireless device 800 may act as a peer machine in peer-to-peer (P2P) (or other distributed) network environment. The wireless device 800 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium such as a hardware storage device or memory. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The wireless device 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. Although not shown, the main memory 804 may contain any or all of removable storage and non-removable storage, volatile memory or non-volatile memory. The wireless device 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The wireless device 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The wireless device 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the wireless device 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the wireless device 800 and that cause the wireless device 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, optical fiber, or phone jacks) or one or more antennas to connect to the communications network 826.

In some example embodiments, the machine 800 may be a portable computing device, such as a smart phone or tablet computer, and have one or more additional input components 830 (e.g., sensors or gauges). Examples of such input components 830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Various embodiments may be a system, a method, and/or a computer program product. The computer program product may include a machine-readable storage medium (or media) having machine-readable program instructions thereon for causing a processor to carry out aspects described herein.

The machine-readable storage medium, sometimes referred to as a machine-readable hardware storage device, which stores signals, but it not the signal itself, can be a tangible device that can retain and store instructions for use by an instruction execution device. A machine-readable hardware storage device may also store data. The machine-readable hardware storage device may be, for example, but is not limited to, an electronic storage device, a magnetic storage device, an optical storage device, an electromagnetic storage device, a semiconductor storage device, or any suitable combination of the foregoing. A non-exhaustive list of more specific examples of the machine-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A machine-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Machine-readable program instructions described herein can be downloaded to respective computing/processing devices from a machine-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives machine-readable program instructions from the network and forwards the machine-readable program instructions for storage in a machine-readable storage medium within the respective computing/processing device.

Machine-readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The machine-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the machine-readable program instructions by utilizing state information of the machine-readable program instructions to personalize the electronic circuitry, in order to perform aspects disclosed herein.

Aspects of the present disclosure are described herein with reference to flowchart illustrations and/or block diagrams of methods, apparatus (systems), and computer program products according to some embodiments. It will be understood that each block of the flowchart illustrations and/or block diagrams, and combinations of blocks in the flowchart illustrations and/or block diagrams, can be implemented by machine-readable program instructions.

These machine-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These machine-readable program instructions may also be stored in a machine-readable storage medium that can direct a computer, a programmable data processing apparatus, and/or other devices to function in a particular manner, such that the machine-readable storage medium having instructions stored therein comprises an article of manufacture including instructions which implement aspects of the function/act specified in the flowchart and/or block diagram block or blocks.

The machine-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An apparatus comprising:
a phased array of antenna elements configured into pluralities of antenna elements, the pluralities of antenna elements configured to generate N modes of orthogonal orbital angular momentum (OAM) radio waves where N is equal to or greater than 2; and
a plurality of quadrature phase shift key (QPSK) modulators, each of the plurality of QPSK modulators configured to receive data bits as input and coupled to a respective one of the pluralities of antenna elements to modulate QPSK symbols onto a respective one of the N modes of orthogonal OAM radio waves,
wherein each of the N modes of orthogonal OAM radio waves operates as an independent data channel,
wherein the apparatus is configured to transmit the modulated orthogonal OAM radio waves, each on a respective one of the pluralities of antenna elements,
wherein N=2 and a first of the QPSK modulators provides a first QPSK constellation for a first mode, and a second of the QPSK modulators provides a second QPSK constellation for a second mode,
wherein the first QPSK constellation and the second QPSK constellation are independent of each other, and
wherein the first QPSK constellation and the second QPSK constellation are orthogonal and are on the same frequency.

2. The apparatus of claim 1 wherein all constellation points of the first QPSK constellation and the second QPSK constellation are equidistant from respective constellation centers of the first QPSK constellation and the second QPSK constellation, all constellation points of the first QPSK constellation and the second QPSK constellation are equidistant from adjacent neighboring constellation points of the first QPSK constellation and the second QPSK constellation, and there is only one constellation symbol per constellation quadrate.

3. The apparatus of claim 1 wherein the first mode is mode M0 and the second mode is mode M1, and both the first QPSK modulator and the second QPSK modulator are 16-QPSK modulators that operate on vectors:

$$\phi_1(t) = \sqrt{\frac{2E_s}{T_s}}\cos(wt) \quad \phi_2(t) = \sqrt{\frac{2E_s}{T_s}}\sin(wt)$$

and the waveform equation is:

$$S(t) = \left(\sqrt{\frac{2E_s}{T_s}}\cos(wt + (2n-1)\frac{\pi}{4})\right)\psi_{M_0} + \left(\sqrt{\frac{2E_s}{T_s}}\cos(wt + (2n-1)\frac{\pi}{4})\right)\psi_{M_1}$$

where:
$\phi_m(t)$ are QPSK basisvectors, where m is 1 or 2;
w is an angular frequency;
$\psi_{M_0}$ is mode 0 two dimensional vector space;
$\psi_{M_1}$ is mode 1 two dimensional vector space;
Es is symbol energy;
Ts is symbol period;
n is a quadrant number for respective ones of the first QPSK modulator and the second QPSK modulator, where n=1, 2, 3, 4; and
t is an independent variable representing a temporal quantity.

4. The apparatus of claim 1 wherein each of the plurality of QPSK modulators are 16-QPSK modulators and each of the 16-QPSK modulators receives two independent bits as input per time period.

5. The apparatus of claim 1 further comprising an antenna interface board configured to couple each QPSK modulator to a respective one of the pluralities of antenna elements, the antenna interface board comprising a respective plurality of phase shifters that provide phase shift to respective antenna elements of the respective one of the pluralities of antenna elements according to the equations:

$$d\phi = M\frac{2\Pi}{N_e}$$

$$\phi_i = N_i\left[M\frac{2\Pi}{N_e}\right]$$

where:
$N_e$ is the number of array elements and $N_e$ is at least 1 plus the mode number M;
M is the mode number and is an integer between [−($N_e$−1) and ($N_e$−1)];
mode 0 is a conventional plane wave;
$\phi_i$ is the phase shift for the $i^{th}$ antenna element; and
$d\phi$ is the phase shift for the antenna element adjacent to the ith antenna element.

6. A method comprising:
activating an apparatus that comprises a plurality of quadrature phase shift key modulators coupled to a phased array of antenna elements configured into pluralities of antenna elements, the pluralities of antenna elements coupled to a plurality of phase shifters for generating N modes of orthogonal orbital angular momentum (OAM) radio waves where N is equal to or greater than 2; and
modulating QPSK symbols onto each of the N modes of orthogonal OAM radio waves by respective ones of the plurality of QPSK modulators, each of the respective ones of the plurality of QPSK modulators being coupled to a respective one of the pluralities of antenna elements to modulate the QPSK symbols onto a respective one of the N modes of orthogonal OAM radio waves,
wherein each of the N modes of orthogonal OAM radio waves operates as an independent data channel,
wherein the apparatus is configured to transmit the modulated orthogonal OAM radio waves, each on a respective one of the pluralities of antenna elements,
wherein N=2 and a first of the QPSK modulators provides a first QPSK constellation for a first mode, and a second of the QPSK modulators provides a second QPSK constellation for a second mode,
wherein the first QPSK constellation and the second QPSK constellation are independent of each other, and
wherein the first QPSK constellation and the second QPSK constellation are orthogonal and are on the same frequency.

7. The method of claim 6 wherein all constellation points of the first QPSK constellation and the second QPSK constellation are equidistant from respective constellation centers of the first QPSK constellation and the second QPSK constellation, all constellation points of the first QPSK constellation and the second QPSK constellation are equidistant from adjacent neighboring constellation points of the first QPSK constellation and the second QPSK constellation, and there is only one constellation symbol per constellation quadrate.

8. The method of claim 6 wherein the first mode is mode M0 and the second mode is mode M1, and the QPSK modulators are 16-QPSK modulators that operate on vectors:

$$\phi_1(t) = \sqrt{\frac{2E_s}{T_s}}\cos(wt) \quad \phi_2(t) = \sqrt{\frac{2E_s}{T_s}}\sin(wt)$$

and the waveform equation is:

$$S(t) = \left(\sqrt{\frac{2E_s}{T_s}}\cos(wt + (2n-1)\frac{\pi}{4})\right)\psi_{M_0} + \left(\sqrt{\frac{2E_s}{T_s}}\cos(wt + (2n-1)\frac{\pi}{4})\right)\psi_{M_1}$$

where:
$\phi_m(t)$ are QPSK basis vectors, where m is 1 or 2;
w is an angular frequency;
$\psi_{M_0}$ is mode 0 two dimensional vector space;
$\psi_{M_1}$ is mode 1 two dimensional vector space;
Es is symbol energy;
Ts is symbol period;
n is a quadrant number for respective ones of the first QPSK modulator and the second QPSK modulator, where n=1, 2, 3, 4; and
t is an independent variable representing a temporal quantity.

9. The method of claim 6 wherein each of the plurality of QPSK modulators are 16-QPSK modulators and each of the 16-QPSK modulators receives two independent data bits as input per time period.

10. The method of claim 6 further comprising configuring an antenna interface board to couple each QPSK modulator to a respective one of the pluralities of antenna elements, the antenna interface board comprising the plurality of phase shifters for providing phase shift to respective antenna elements of the respective one of the pluralities of antenna elements according to the equations:

$$d\phi = M\frac{2\Pi}{N_e}$$

-continued $$\phi_i = N_i \left[ M \frac{2\Pi}{N_e} \right]$$

where:
N$_e$ is the number of array elements and N$_e$ is at least 1 plus the mode number M;
M is the mode number and is an integer between [−(N$_e$−1) and (N$_e$−1)];
mode 0 is a conventional plane wave;
ϕ$_i$ is the phase shift for the i$^{th}$ antenna element; and
dϕ is the phase shift for the antenna element adjacent to the ith antenna element.

11. One or more computer-readable hardware storage device having stored therein a set of instructions which, when executed by one or more processors of a computer, causes the computer to execute operations comprising:
activating an apparatus that comprises a plurality of quadrature phase shift key QPSK modulators coupled to a phased array of antenna elements configured into pluralities of antenna elements, each of the pluralities of antenna elements coupled to a plurality of phase shifters for generating N modes of orthogonal orbital angular momentum (OAM) radio waves where N is equal to or greater than 2; and
modulating QPSK symbols onto each of the N modes of orthogonal OAM radio waves by respective ones of the plurality of QPSK modulators, each of the respective ones of the plurality of QPSK modulators being coupled to a respective one of the pluralities of antenna elements to modulate the QPSK symbols onto a respective one of the N modes of orthogonal OAM radio waves,
wherein each of the N modes of orthogonal OAM radio waves operates as an independent data channel,
wherein the apparatus is configured to transmit the modulated orthogonal OAM radio waves, each on a respective one of the pluralities of antenna elements,
wherein N=2 and a first of the QPSK modulators provides a first QPSK constellation for a first mode, and a second of the QPSK modulators provides a second QPSK constellation for a second mode,
wherein the first QPSK constellation and the second QPSK constellation are independent of each other, and
wherein the first QPSK constellation and the second QPSK constellation are orthogonal and are on the same frequency.

12. The one or more computer-readable hardware storage device of claim 11 wherein all constellation points of the first QPSK constellation and the second QPSK constellation are equidistant from respective constellation centers of the first QPSK constellation and the second QPSK constellation, all constellation points of the first QPSK constellation and the second QPSK constellation are equidistant from adjacent neighboring constellation points of the first QPSK constellation and the second QPSK constellation, and there is only one constellation symbol per constellation quadrate.

13. The one or more computer-readable hardware storage device of claim 11 wherein the first mode is mode M0 and the second mode is mode M1, and the QPSK modulators are 16-QPSK modulators that operate on vectors:

$$\phi_1(t) = \sqrt{\frac{2E_s}{T_s}} \cos(wt) \quad \phi_2(t) = \sqrt{\frac{2E_s}{T_s}} \sin(wt)$$

and the waveform equation is:

$$S(t) = \left( \sqrt{\frac{2E_s}{T_s}} \cos(wt + (2n-1)\frac{\pi}{4}) \right) \psi_{M_0} + \left( \sqrt{\frac{2E_s}{T_s}} \cos(wt + (2n-1)\frac{\pi}{4}) \right) \psi_{M_1}$$

where:
ϕ$_m$(t) are QPSK basis vectors, where m is 1 or 2;
w is an angular frequency;
ψ$_{M_0}$ is mode 0 two dimensional vector space;
ψ$_{M1}$ is mode 1 two dimensional vector space;
Es is symbol energy;
Ts is symbol period;
n is a quadrant number for respective ones of the first QPSK modulator and the second QPSK modulator, where n=1, 2, 3, 4; and
t is an independent variable representing a temporal quantity.

14. The one or more computer-readable hardware storage device of claim 11 wherein each of the plurality of QPSK modulators are 16-QPSK modulators and each of the 16-QPSK modulators receives two independent data bits as input per time period.

15. The one or more computer-readable hardware storage device of claim 11, the operations further comprising configuring an antenna interface board to couple each QPSK modulator to a respective one of the pluralities of antenna elements, the antenna interface board comprising the plurality of phase shifters to provide phase shift to respective antenna elements of the respective one of the pluralities of antenna elements according to the equations:

$$d\phi = M2\Pi/N\_e$$

$$\phi\_i = N\_i[M2\Pi/N\_e]$$

where:
Ne is the number of array elements and Ne is at least 1 plus the mode number M;
M is the mode number and is an integer between [−(N$_e$−1) and (N$_e$−1)];
mode 0 is a conventional plane wave;
ϕ_i is the phase shift for the i$^{th}$ antenna element; and
dϕ is the phase shift for the antenna element adjacent to the i$^{th}$ antenna element.

* * * * *

UNITED STATES PATENT AND TRADEMARK OFFICE
CERTIFICATE OF CORRECTION

Page 1 of 3

PATENT NO. : 10,079,706 B2
APPLICATION NO. : 15/215937
DATED : September 18, 2018
INVENTOR(S) : Graceffo et al.

It is certified that error appears in the above-identified patent and that said Letters Patent is hereby corrected as shown below:

In the Drawings

Sheet 6 of 8, Fig. 6, reference numeral 602b, Line 1 (Second Occurrence), delete "602b" and insert --603b-- therefor In the Specification In Column 2, Line 49, delete "802.1 lax" and insert --802.11ax-- therefor In Column 6, table 1, Line 10, delete "16-QPAK" and insert --16-QPSK-- therefor In Column 7, Line 11, after "is", insert --an--

In Column 7, Line 11, delete "annular" and insert --angular-- therefor

In Column 7, Line 14, delete "Es" and insert --$E_s$-- therefor

In Column 7, Line 15, delete "Ts" and insert --$T_s$-- therefor

In Column 7, Line 41, delete "M0" and insert --$M_0$-- therefor

In Column 7, Line 58, delete "N_e" and insert --$N_e$-- therefor

In Column 7, Line 65, delete "ith" and insert --$i^{th}$-- therefor

In Column 8, Line 6, delete "M0" and insert --$M_0$-- therefor

In Column 8, Line 12, delete "convertor" and insert --converter-- therefor

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,079,706 B2

In the Claims

In Column 14, Line 37, in Claim 1, after "wherein", insert --when--

In Column 14, Line 37, in Claim 1, delete "and a" and insert --the-- therefor

In Column 14, Line 40, in Claim 1, delete "mode," and insert --mode-- therefor

In Column 14, Line 58, in Claim 3, delete "M0" and insert --$M_0$-- therefor

In Column 14, Line 58, in Claim 3, delete "M1," and insert --$M_1$,-- therefor

In Column 15, Line 9, in Claim 3, delete "basisvectors," and insert --basis vectors,-- therefor In Column 15, Line 13, in Claim 3, delete "Es" and insert --$E_s$-- therefor In Column 15, Line 14, in Claim 3, delete "Ts" and insert --$T_s$-- therefor In Column 15, Line 50, in Claim 5, delete "ith" and insert --$i^{th}$-- therefor In Column 16, Line 6, in Claim 6, after "wherein", insert --when--

In Column 16, Line 6, in Claim 6, delete "and a" and insert --the-- therefor

In Column 16, Line 7, in Claim 6, delete "a" and insert --the-- therefor

In Column 16, Line 9, in Claim 6, delete "mode," and insert --mode-- therefor

In Column 16, Line 26, in Claim 8, delete "M0" and insert --$M_0$-- therefor

In Column 16, Line 26, in Claim 8, delete "M1," and insert --$M_1$,-- therefor

In Column 16, Line 42, in Claim 8, delete "$\phi_m$ (t)" and insert --$\phi_m(t)$-- therefor In Column 16, Line 46, in Claim 8, delete "Es" and insert --$E_s$-- therefor In Column 16, Line 47, in Claim 8, delete "Ts" and insert --$T_s$-- therefor In Column 16, Line 48, in Claim 8, delete "a" and insert --the-- therefor In Column 17, Line 14, in Claim 10, delete "ith" and insert --$i^{th}$-- therefor In Column 17, Line 20, in Claim 11, delete "QPSK" and insert --(QPSK)-- therefor In Column 17, Line 40, in Claim 11, after "wherein", insert --when--

CERTIFICATE OF CORRECTION (continued)
U.S. Pat. No. 10,079,706 B2

In Column 17, Line 40, in Claim 11, delete "and a" and insert --the-- therefor

In Column 17, Line 43, in Claim 11, delete "mode," and insert --mode-- therefor

In Column 18, Line 2, in Claim 13, delete "M0" and insert --$M_0$-- therefor

In Column 18, Line 3, in Claim 13, delete "M1," and insert --$M_1$,-- therefor

In Column 18, Line 22, in Claim 13, delete "$\psi_{M1}$" and insert --$\psi_{M_1}$-- therefor In Column 18, Line 23, in Claim 13, delete "Es" and insert --$E_s$-- therefor In Column 18, Line 24, in Claim 13, delete "Ts" and insert --$T_s$-- therefor In Column 18, Line 25, in Claim 13, delete "a" and insert --the-- therefor In Column 18, Lines 52-53, in Claim 15, delete "[-($N_e$-1) and ($N_e$-1)];" and insert --[-(N_e-1) and (N_e-1)];-- therefor